US012418797B2

(12) United States Patent
Balmakhtar et al.

(10) Patent No.: US 12,418,797 B2
(45) Date of Patent: Sep. 16, 2025

(54) SYSTEMS AND METHODS FOR SECURING APPLICATIONS EXECUTED ON COMMUNICATION SYSTEMS

(71) Applicant: T-Mobile Innovations LLC, Overland Park, KS (US)

(72) Inventors: Marouane Balmakhtar, Fairfax, VA (US); Serge Mukerji Manning, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 198 days.

(21) Appl. No.: 18/325,923

(22) Filed: May 30, 2023

(65) Prior Publication Data

US 2024/0406733 A1    Dec. 5, 2024

(51) Int. Cl.
*H04W 12/122* (2021.01)

(52) U.S. Cl.
CPC .................................. *H04W 12/122* (2021.01)

(58) Field of Classification Search
CPC . H04W 12/08; H04W 12/086; H04W 12/088; H04W 12/10; H04W 12/12; H04W 12/121; H04W 12/122; H04W 12/30; H04W 12/37
See application file for complete search history.

(56) References Cited

U.S. PATENT DOCUMENTS

| 9,413,839 | B2 |  | 8/2016 | Annan et al. |
| 10,567,398 | B2 | * | 2/2020 | Watkins .................. H04L 43/04 |
| 10,893,058 | B1 | * | 1/2021 | Casaburi ............... G06F 21/566 |
| 11,012,410 | B2 | * | 5/2021 | Hajduczenia ....... H04L 63/0218 |
| 11,563,777 | B2 | * | 1/2023 | Scherer .................... H04L 63/20 |
| 11,671,438 | B2 | * | 6/2023 | Devarajan ............... H04L 43/12 726/23 |
| 11,949,577 | B2 | * | 4/2024 | Balaiah .................. H04L 43/10 |
| 11,949,578 | B2 | * | 4/2024 | Kamath .................. H04L 69/18 |
| 12,088,606 | B2 | * | 9/2024 | Prudkovskiy ....... H04L 63/0236 |

(Continued)

FOREIGN PATENT DOCUMENTS

| JP | 2013534081 A | 8/2013 |
| JP | 6253033 B2 | 12/2017 |

(Continued)

OTHER PUBLICATIONS

US 8,089,898 B2, 01/2012, Raleigh (withdrawn)

(Continued)

*Primary Examiner* — Hosuk Song

(57) ABSTRACT

A method for configuring a network of a communication system to secure applications executable on user equipment (UE) connectable to the network. The method includes receiving a predefined first traffic signature corresponding to a first application, and configuring a network traffic monitoring tool to detect an activation of the first application executing on the UE. The method additionally includes configuring the network traffic monitoring tool to monitor active traffic manifested on the network associated with the first application, configuring a traffic signature comparison tool to detect a security breach associated with the first application, and configuring an alarm tool issue an alarm and/or act against the first application.

20 Claims, 7 Drawing Sheets

(56) References Cited

U.S. PATENT DOCUMENTS

| | | | |
|---|---|---|---|
| 2005/0055696 A1 | 3/2005 | Betzler et al. | |
| 2010/0188975 A1* | 7/2010 | Raleigh | H04W 8/20 370/230.1 |
| 2011/0161484 A1 | 6/2011 | Van den Bogaert et al. | |
| 2011/0314145 A1 | 12/2011 | Raleigh et al. | |
| 2012/0117478 A1 | 5/2012 | Vadde et al. | |
| 2013/0294307 A1 | 11/2013 | Johansson | |
| 2014/0036697 A1 | 2/2014 | Annan et al. | |

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Camiant, et al., "New mechanism for detection and report of applications to PCRF." China Mobile, Aug. 31-Sep. 4, 2009, 4 pages, Kyoto, Japan.

Office Action dated Dec. 17, 2014, U.S. Appl. No. 13/563,709, filed Jul. 31, 2012.

Final Office Action dated Jun. 23, 2015, U.S. Appl. No. 13/563,709, filed Jul. 31, 2012.

Final Office Action dated Sep. 15, 2015, U.S. Appl. No. 13/563,709, filed Jul. 31, 2012.

Advisory Action dated Jan. 29, 2016, U.S. Appl. No. 13/563,709, filed Jul. 31, 2012.

Notice of Allowance dated Mar. 1, 2016, U.S. Appl. No. 13/563,709, filed Jul. 31, 2012.

Supplemental Notice of Allowance dated Jul. 11, 2016, U.S. Appl. No. 13/563,709, filed Jul. 31, 2012.

Annan, Brandon C., et al., International Application entitled, "Traffic Management of Third Party Applications", International Application No. PCT/US2013/052805 filed on Jul. 24, 2013.

Foreign Communication From a Related Counterpart Application International Preliminary Report on Patentability dated Feb. 12, 2015 International Application No. PCT/US2013/052805 filed on Jul. 24, 2013.

Foreign Communication from a Related Counterpart—International Search Report and Written Opinion dated Oct. 4, 2013, filed on Jul. 24, 2013 International Application No. PCT/US2013/052805.

Foreign Communication from a Related Counterpart—Japanese Office Action dated Jun. 7, 2017, JP No. 2015-525524.

\* cited by examiner

SYSTEMS AND METHODS FOR SECURING APPLICATIONS EXECUTED ON COMMUNICATION SYSTEMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic applications stored on user equipment (UE), when executed, may establish a communication link via a communication system or network whereby the application may access information, including personally identifiable information (PII), stored on one or more servers of the communication system. As but one example, an application in the form of a banking application stored on a user's smartphone may access, via a communication system, banking information stored on one or more servers of the communication system managed by the financial institution associated with the given banking application. The flow or communication of information or data between the banking application stored on the user's smartphone and the one or more servers storing the banking information may be referred to as traffic on the communication system.

SUMMARY

In an embodiment, a method for configuring a network of a communication system to secure applications executable on UE connectable to the network is disclosed. The method includes receiving from a first entity associated with a first application executable on the UE a predefined first traffic signature corresponding to the first application, and storing the first traffic signature in a datastore of the communication system. The method additionally includes configuring a network traffic monitoring tool of an application security system to detect an activation of the first application executing on the UE whereby active traffic associated with the first application manifests on the network, and configuring the network traffic monitoring tool to monitor the active traffic manifested on the network associated with the first application in response to detecting the activation of the first application. The method further includes configuring a traffic signature comparison tool of the application security system to detect a security breach associated with the first application in response to comparing the active traffic associated with the first application monitored by the network traffic monitoring tool with the first traffic signature stored in the datastore, and configuring an alarm tool of the application security system to at least one of issue an alarm and act against the first application in response to the traffic signature comparison tool detecting the security breach associated with the first application.

In another embodiment, a method for securing applications executable on UE connectable to a network of a communication system is disclosed. The method includes detecting by a network traffic monitoring tool of an application security system the activation of a first application executing on the UE whereby active traffic associated with the first application manifests on the network, and monitoring by the network traffic monitoring tool the active traffic manifested on the network and associated with the first application. The method additionally includes comparing by a traffic signature comparison tool of the application security system the active traffic manifested on the network and associated with the first application with a predefined first traffic signature corresponding to the first application and stored in a datastore of the communication system, and detecting by the traffic signature comparison tool a security breach associated with the first application in response to the active traffic associated with the first application deviating from the first traffic signature by a predefined first threshold. The method further includes at least one of issuing an alarm and acting against the first application by an alarm tool of the application security system in response to the traffic signature comparison tool detecting the security breach associated with the first application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
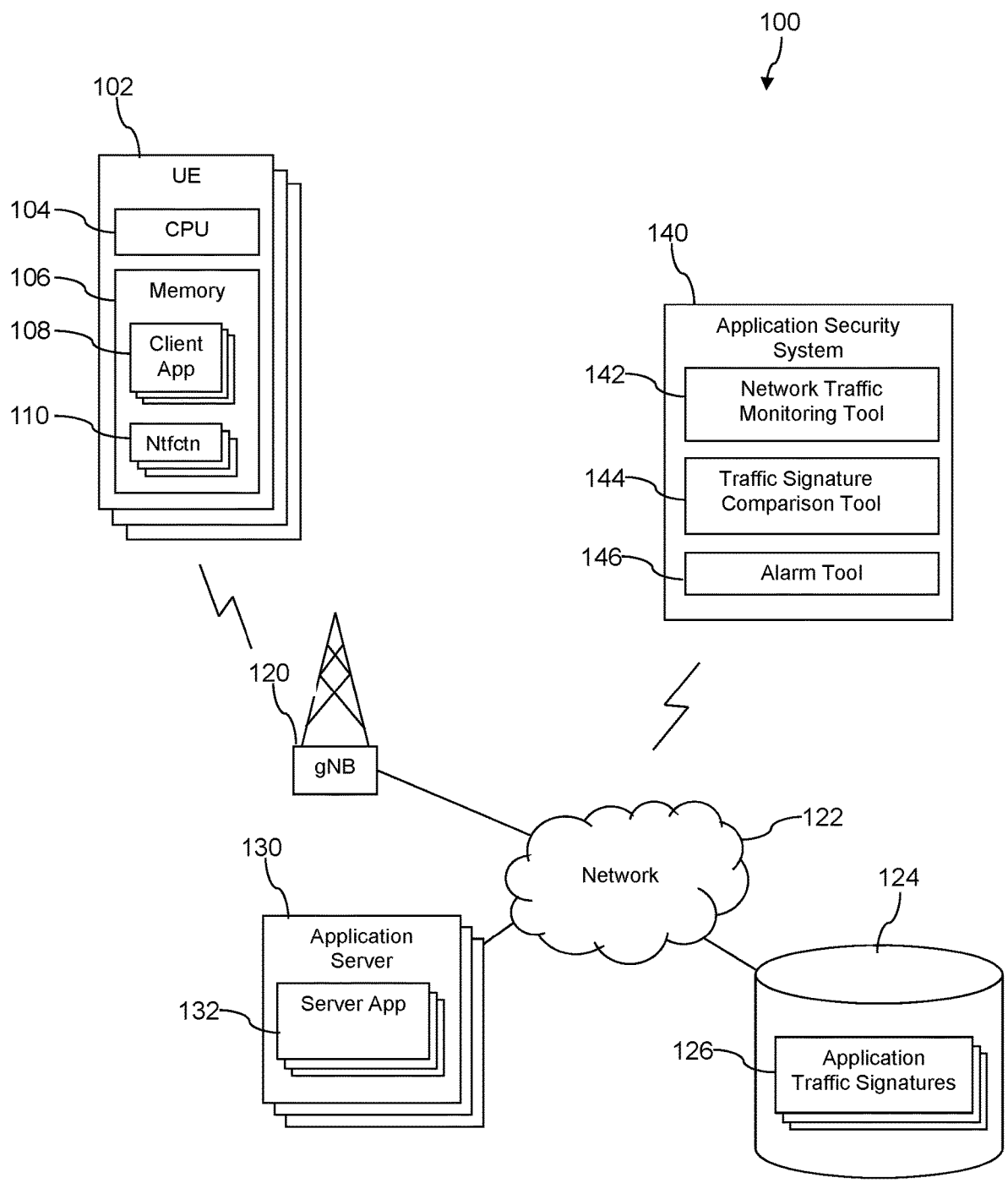
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "computer system" refers to both individual computer systems and networked computer systems which may collectively define a communication system. As described above, applications stored on a UE may access and transmit information to one or more servers via a communication system establishing signal communication between the UE and the one or more servers, where the one or more servers may be maintained by a third-party institution associated with the application stored on the UE, such as a developer of the application or a sponsor of the application. The flow or communication of information between the UE and the one or more servers manifests as traffic on the communication system.

It may be understood that a UE is often equipped with limited security controls and may operate in uncontrolled environments, potentially compromising the security of the UE and the applications and information stored thereon. Particularly, the security of the UE may, in at least some instances, be substantially more limited than the security afforded to servers of the communication system to which the UE may connect. These limitations make the UE a prime target for bad actors seeking to obtain unauthorized access to information, such as PII and other sensitive information, either stored on the UE or accessible by the UE through a communication system connected to the UE.

As an example, UE may become corrupted by viruses such as malware and/or other malicious software whereby unauthorized access to the UE may be obtained by bad actors using the malicious software. In addition to obtaining unauthorized access to the UE using malicious software, bad actors may attempt to illicitly obtain additional information stored not on the UE itself but on one or more servers of a communication system connected to the UE. For instance, by obtaining unauthorized access to a banking application stored on the UE, the bad actors may attempt to obtain sensitive banking information from one or more servers of the communication system hosting said banking information and associated with a third-party financial institution associated with the banking application. Alternatively, or in addition, the bad actors may even attempt to fraudulently obtain access to property of the user (e.g., funds from the user's bank account) via obtaining unauthorized access to the one or more servers containing said banking information. Thus, a UE, given its limited security, may provide a tool for bad actors seeking to obtain unauthorized access to one or more servers accessible by the UE through the communication system, where the one or more servers may have more extensive security features than the UE itself making the servers more difficult to compromise directly by the bad actors.

It may be understood that both normal, authorized communication between the UE and the one or more servers of the communication system, as well as unauthorized communication between a compromised UE and the one or more servers of the communication system each manifests as traffic on the communication system. While both authorized communications and unauthorized communications across the communication system each manifests as traffic on the communication system, one or more properties of authorized traffic associated with a given application stored on UE may vary from one or more corresponding properties of unauthorized traffic also associated with the same application stored on the UE. For example, properties such as the number of connections made between the UE and the one or more servers, the destination addresses of the one or more servers in terms of uniform resource locators (URLs), fully qualified domain names (FQDNs), and/or network sockets such as internet protocol (IP) tuples, the typical expected duration of each connection made between the UE and the one or more servers, and the properties of each connection made between the UE and the one or more servers in terms of quality of service (QOS) parameters such as maximum bit rate, average bit rate, and others.

In an embodiment, systems and methods for securing applications executed on a UE connectable to communication systems are provided. Particularly the communication system to which the UE may connect is provisioned with an application security system for securing one or more applications stored on the UE. In some embodiments, at least some of the components and features of the application security system are integrated into a 5G core network of the communication system. However, in other embodiments, the application security system may be connectable with, but entirely external from, a 5G core network of the communication system. Generally, the application security system is configured to detect, based on network traffic associated with the application, the corruption or compromisation of an application executed on the UE connected to the communication system, where the detection of the corruption or compromisation of the application may be made by a feature of a core network of the communication system connected to the UE.

Particularly, in an embodiment, the communication system may be provisioned, along with the application security system, a datastore containing one or more network traffic signatures corresponding to one or more different applications stored on the UE connectable to the network of the communication system. For example, a first sponsor or developer of a first application (e.g., a banking application) may provision the datastore with a first traffic signature consistent with and specific to the type of network traffic associated with normal, authorized usage of the first application. Similarly, a second sponsor or developer of a second application (e.g., a healthcare provider application) may provision the datastore with a second traffic signature that is different from the first traffic signature and which is consistent with and specific to the type of network traffic associated with normal, authorized usage of the second application. The provisioning of the datastore with the one or more traffic signatures may occur before the one or more applications associated with the one or more traffic signatures are made commercially available on the UE. Additionally, in some embodiments, the application security system may facilitate the provisioning of the datastore with the one or more traffic signatures provided by the sponsor/developer associated with the one or more corresponding applications.

In this manner, the traffic signatures are unique or tailored to the type of network traffic associated with normal, authorized usage of an application associated with the respective traffic signature. Additionally, the traffic signatures may conveniently leverage 5G core network features. For example, in some embodiments, the traffic signatures may be utilized by a session management function (SMF) and/or a policy control function (PCF) of a 5G core network as will be discussed further herein.

In an embodiment, the application security system includes a network traffic monitoring tool, a traffic signature comparison tool (e.g., a traffic comparison tool or engine), and an alarm tool. In some embodiments, the network traffic monitoring tool initially detects the initiation of an application on the UE whereby traffic ascribed to the application manifests on a network of the communication system. To state in other words, the network traffic monitoring tool may detect the initiation of an active connection (e.g., a protocol data unit (PDU) session established by a SMF of a 5G core network) between the application and the network of the communication system. In addition to detecting the initiation of the application, the network traffic monitoring tool may monitor the active traffic on the network of the communication system associated with the application. Particularly, the network traffic monitoring tool monitors the active traffic on the network associated with the application without either inspecting the contents of the traffic or determining the purpose or function of the application (e.g., what actions are being performed by the application) so as to maintain the privacy of the user operating the UE on which the application is executing.

In some embodiments, the application security system (or components thereof such as the traffic signature comparison tool) may only be activated when a monitored application is also activated, maximizing the efficiency of the application security system. Additionally, in some embodiments, the network traffic monitoring tool comprises a component or feature of a core network of the communication system, such as a 5G core network. For instance, the network traffic monitoring tool may comprise a unified data management (UDM) of a 5G core network, as will be discussed further herein. In this manner, the application security system may avoid burdening the limited resources of a respective user's UE.

In some embodiments, when the application security system is activated, the application security system may ensure that traffic between a user's UE and the network is routed using a radio access network (RAN) provisioned by an operator of the network instead of through another access point such as, for example, a WiFi access point. In this manner, the traffic communicated through the RAN may be continuously monitored by the application security system (given that the RAN is provisioned by the operator of the network), enhancing the security of the connection formed between the UE and the network. It may be understood that such monitoring may not be feasible for other access points, such as WiFi access points, which may lie outside of the purview of the application security system.

The traffic signature comparison tool of the application security system may compare the active traffic associated with the application as monitored by the network traffic monitoring tool with a predefined traffic signature provisioned by a developer or sponsor of the application and stored in the datastore of the communication system. Additionally, the traffic signature comparison tool may detect a security breach of the application in response to the active traffic monitored by the network traffic monitoring tool departing from the traffic signature by one or more predefined thresholds. In this manner, the traffic signature may detect the unauthorized access and use of the application. For example, the traffic signature comparison tool may determine that the application has been corrupted or otherwise compromised by malicious software such as malware resulting in the unauthorized usage of the application on the network of the communication system.

As used herein, the phrase "detect a security breach," "detecting a security breach" and the like may be understood as meaning the traffic signature comparison tool has inferred an unauthorized modification to the application, where this inference by the traffic signature comparison tool is based on the active traffic departing from the traffic signature by the one or more predefined thresholds. It may be understood that in at least some instances the active traffic may depart from the traffic signature by one or more predefined thresholds for reasons other than the unauthorized modification of the application, and thus the detection of the security breach corresponds to an inference that a security breach has occurred. Although in some instances the detection of the security breach may be a false positive, it still may be beneficial to take action to address the potential security breach than to allow the application unimpeded access to the network.

The alarm tool of the application security system may take one or more mitigation steps or actions in response to the detection of a security breach of an application by the traffic signature comparison tool. For example, in some embodiments, the alarm tool transmits one or more notifications to the UE to notify a user of the UE of the security breach of given application executed on the UE. In some embodiments, the alarm tool may send one or more notifications to the developer or sponsor of the application, such as the developer/sponsor that originally provisioned the communication system with a traffic signature associated with the application. In certain embodiments, the alarm tool may limit the performance or usability of the application on the network of the communication system. For example, in certain embodiments, the alarm tool may limit or throttle the traffic on the network associated with the application. In certain embodiments, the alarm tool may even entirely block communication from or to the application across the network of the communication system to thereby disable the application's access to the network.

By automatically detecting the unauthorized access to or use of an application executing on the UE, embodiments of application security systems described herein may improve the performance of the communication system comprising the application security system. Particularly, embodiments of application security systems described herein may improve the performance of the communication system by providing value added assurance to end users regarding the security of the applications stored on their UE. Additionally, embodiments of application security systems described herein may improve the performance of the communication system by preventing or at least inhibiting bad actors from obtaining unauthorized access to a network of the communication system via corrupted or compromised UE.

Turning to FIG. 1, a communication system 100 is described. As previously described, it may be understood that communication system 100 comprises a computer system, such as a networked computer system. In an embodiment, the communication system 100 generally includes an electronic device (user equipment-UE) 102, an access node 120, a network 122, a datastore 124, an application server 130, and an application security system 140. The UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 122 such as an enterprise, organization, or individual.

The access node 120 of communication system 100 may provide communication coupling the UE 102 to the network 122 according to a 5G protocol, for example 5G, 5G New Radio, or 5G radio communication protocols. The access node 120 may provide communication coupling the UE 102 to the network 122 according to a long term evolution (LTE), a code division multiple access (CDMA), and/or a global system for mobile communication (GSM) radio communication protocol. The access node 120 may be referred to for some contexts as a 5G Node B (gNB), an enhanced Node B (eNB), a cell site, or a cell tower. Additionally, while not shown, UE 102 may be communicatively coupled to the network 122 via a WiFi access point or another non-cellular radio device. Further, while a single access node 120 is illustrated in FIG. 1, it is understood that communication system 100 may comprise any number of access nodes 120.

The network 122 of communication system 100 may comprise one or more public networks, one or more private networks, one or more cloud networks (e.g., having features on-premise or in the cloud) or a combination thereof. For example, network 106 may comprise a core network, such as a 5G core network. Further details of 5G networks are discussed below with reference to FIGS. 4A, 4B. While shown as communicatively coupled to the network 122, datastore 124, application server 130, and application security system 140 may be considered part of network 122 and are illustrated as separate from network 122 in FIG. 1 to promote discussing their roles with respect to UE 102, as will be discussed further herein. Additionally, although in FIG. 1 network 122 is shown as including only a single datastore 124 and application server 130, it may be understood that network 122 may include varying numbers of datastores and servers.

In this exemplary embodiment, datastore 124 comprises one or more application traffic signatures 126 associated with or corresponding to one or more of the client applications 108 stored on UE 102. In some embodiments, network 122 comprises a 5G core network and, in addition or alternatively to storing the application traffic signatures 126 in datastore 124, the application traffic signatures 126 may be loaded into the UDM of the 5G core network using an application function (AF) of the communication system 100. The one or more application traffic signatures 126 each correspond or are associated with one of the client applications 108 stored on UE 102 (e.g., a first application traffic signature 126 corresponds to a first client application 108, a second application traffic signature 126 corresponds to a second client application 108).

In some embodiments, the application traffic signatures 126 stored in datastore 124 are provisioned by one or more corresponding entities associated with the client applications 108 corresponding to the application traffic signatures 126. For example, a first entity (e.g., a banking institution) associated (e.g., as a developer, as a sponsor) with a first client application 108 (e.g., a banking application) may provision the communication system 100 with a first application traffic signature 126 corresponding to the first client application 108. Similarly, a second entity (e.g., a healthcare provider) associated (e.g., as a developer, as a sponsor) with a second client application 108 (e.g., a healthcare provider application) may provision the communication system 100 with a second application traffic signature 126 that corresponds to the second client application 108 and is different from the first application traffic signature 126 described above. To state in other words, the first application traffic signature 126 is specific to the first client application 108 while the second application traffic signature 126 is specific to the second client application 108.

The application traffic signatures 126 stored in datastore 124 of communication system 100 contain information pertaining to the typical, authorized operation of the client applications 108 to which they correspond. In other words, application traffic signatures 126 contain information pertaining to the expected network traffic that would manifest on network 122 in response to normal, authorized usage of the client application 108 corresponding to the given application traffic signature 126.

In some embodiments, each application traffic signature 126 comprises, among other parameters, the number of expected connections over a predefined period of time made between the client application 108 and an application server (e.g., application server 130) of communication system 100 associated with the given client application 108, expected identities of destination addresses of network traffic ascribed to the client application 108, and one or more expected QoS parameters of network traffic ascribed to the client application 108. For example, each application traffic signature 126 may specify the expected or typical destination addresses of network traffic associated with the given client application 108 in terms of, for example, URLs, FQDNs, and/or network sockets such as IP tuples, where the term "IP tuples" refers to the collection of parameters that define the endpoints for sending and receiving data across a network such as source and destination IP addresses along with source and destination transport ports and protocol ID (e.g., a 5-tuple). Network traffic associated with the client application 108 directed towards destination addresses outside of the destination addresses included in the application traffic signature 126 corresponding to the client application 108 may indicate that a security breach of the client application 108 (e.g., the application 108 has become corrupted or otherwise compromised by bad actors) has occurred.

As another example, the expected or typical duration of each connection (e.g., each PDU session) formed between a client application 108 and the network 122 may be contained in an application traffic signature 126 corresponding to the client application 108. A PDU session established between the network 122 and the client application 108 having a duration that departs from the expected duration contained in the corresponding application traffic signature 126 by one or more predefined thresholds may indicate that a security breach of the client application 108 has occurred.

As a further example, the expected or typical properties of each connection (e.g., a PDU session) formed between a client application 108 and the network 122 may be contained in an application traffic signature 126 corresponding to the client application 108. The expected properties contained in the application traffic signature 126 may include an expected maximum bitrate, an expected average bitrate, and other QoS properties, such as the QoS properties of QoS flows within a given PDU session. A PDU session established between the network 122 and the client application 108 having properties (e.g., QoS properties as outlined above) that depart from the expected properties contained in the corresponding application traffic signature 126 by one or more predefined thresholds may indicate that a security breach of the client application 108 has occurred.

In addition to containing information pertaining to the expected properties of network traffic arising from normal, authorized usage of a corresponding client application 108, each application traffic signature 126 may also contain a predefined traffic detection filter usable by the application security system 140 to detect the activation of a client application 108 corresponding to the given application traffic signature 126. Particularly, the application security system 140 may use the traffic detection filter contained in the application traffic signature 126 to detect the activation of the given client application 108 such as the creation of a new PDU session between the network 122 and the client application 108.

The UE 102 includes a processor or CPU 104 and a memory 106 in signal communication with the processor 104. Additionally, UE 102 includes one or more client applications 108 stored in a non-transitory portion of the memory 106 and executable by the processor 104. Additionally, the execution of client applications 108 by a user of UE 102 may generate one or more notifications 110 associated with the client applications 108.

UE 102 may access various resources of network 122 through the access node 120. For example, a user of UE 102 may transmit information from UE 102 to the network 122 through the access node 120 and save the transmitted information on the network 122, such as on datastore 124. In addition, UE 102 may particularly access resources of the application server 130, where application server 130 may include one or more server applications 132. Server applications 132 may provide one or more services or features accessible by the user through the UE 102. The accessing of the one or more server applications 132 by the UE 102 may trigger the generation of one or more notifications 110 by the client applications 108 of UE 102.

The application security system 140 of communication system 100 may access various resources and components of communication system 100 such as, for example, UE 102, datastore 124, and application server 130 via the network 122. Application security system 140 of communication system 100 is generally configured to automatically detect security breaches associated with client applications 108 by monitoring traffic manifested on the network 122 in response to the activation of the client application 108. As will be discussed further herein, the application security system 140 may also act based on the detection of a security breach of one of the client applications 108 by, for example, issuing an alarm or acting against the specific client application 108 (e.g., degrading the performance of the client application 108 and/or blocking the client application 108 from accessing the network 122) associated with the security breach.

In this exemplary embodiment, the application security system 140 generally includes a network traffic monitoring tool 142, a traffic signature comparison tool 144, and an alarm tool 146. The network traffic monitoring tool 142 is generally configured to detect the activation of a client application 108 having a corresponding application traffic signature 126 stored on the communication system 100 (e.g., stored in the datastore 124 of communication system 100), and to monitor the network traffic ascribed to the client application 108 on the network 122 in response to detecting the activation of the client application 108. In some embodiments, the network traffic monitoring tool 142 uses the traffic detection filter contained in the application traffic signature 126 corresponding to the client application 108 to detect the activation of the client application 108, such as the creation of a new PDU session between the network 122 (comprising a 5G core network in this example) and the client application 108.

In some embodiments, the network traffic monitoring tool 142 may monitor parameters corresponding to the expected parameters contained in the application traffic signature 126 corresponding to the given client application 108. For example, the network traffic monitoring tool 142 may monitor, among other things, the number of actual connections over a predefined period of time made between the client application 108 and an application server (e.g., application server 130) of the communication system associated with the client application 108, the actual identities of destination addresses of traffic on the network 122 ascribed to the client application 108, and one or more actual QoS parameters (e.g., an actual maximum bitrate, an actual average bitrate) of the traffic on the network 122 ascribed to the client application 108.

The traffic signature comparison tool 144 of application security system 140 is generally configured to compare the active network traffic (e.g., the actual or current network traffic existing on the network 122 ascribed to the client application 108) ascribed to the client application 108 as monitored by the network traffic monitoring tool 142 with the application traffic signature 126 corresponding to the client application 108. In this manner, the traffic signature comparison tool 144 is configured to detect a security breach of the client application 108 in response to the active network traffic deviating from the application traffic signature 126 by one or more predefined thresholds.

As an example, traffic signature comparison tool 144 may detect a security breach of the client application 108 in response to the number of connections formed between the client application 108 and the network 122 deviating by a predefined threshold from the expected number of connections over a similar period of time as defined by the corresponding application traffic signature 126. As another example, traffic signature comparison tool 144 may detect a security breach of the client application 108 in response to the identities of destination addresses of the active network traffic ascribed to the client application 108 deviating by a predefined threshold from the expected identities of the destination addresses defined by the application traffic signature 126. This could be in terms of the percentage of unexpected destination addresses deviating from the expected destination addresses by a predefined threshold where the predefined threshold may be zero such that any active network traffic ascribed to the client application 108 directed towards a destination address not provided by the application traffic signature 126 would trigger the detection of a security breach of the client application 108 by the traffic signature comparison tool 144. As a further example, traffic signature comparison tool 144 may detect a security breach of the client application 108 in response to QoS parameters of the active network traffic ascribed to the client application 108 deviating from the expected QoS parameters defined by the application traffic signature 126 by traffic signature comparison tool 144.

The alarm tool 146 of application security system 140 is generally configured to address the security breach of the client application 108 detected by the traffic signature comparison tool 144. For example, the alarm tool 146 may issue an alarm in the form of a notification transmitted to at least one of the UE 102 (e.g., as a notification 110) and an entity associated with the client application 108 (e.g., a developer or sponsor of the client application 108) indicating the security breach in response to the traffic signature comparison tool 144 detecting the security breach associated with the client application 108. This may provide a warning to the user of the UE 102 and/or to the developer or sponsor of the client application 108 of the security breach so that the user and/or developer/sponsor may act to address the security breach such as by blocking access to the network 122 for the client application 108.

As another example, the alarm tool 146 may act against the client application 108 by at least one of degrading the performance of the client application 108 and blocking access to the network 122 for the first application in response to the traffic signature comparison tool 144 detecting the security breach associated with the client application 108. For example, the alarm tool 146 may degrade or decrease one or more QoS parameters (e.g., decrease maximum permittable bit rate, decrease permissible average bit rate) of any connection established between the client application 108 subject to the detected security breach and the network 122. In another example, the alarm tool 146 may block or prevent the client application 108 subject to the security breach from connecting with the network 122 so as to prevent any contagion from the client application 108.

Figure 2:
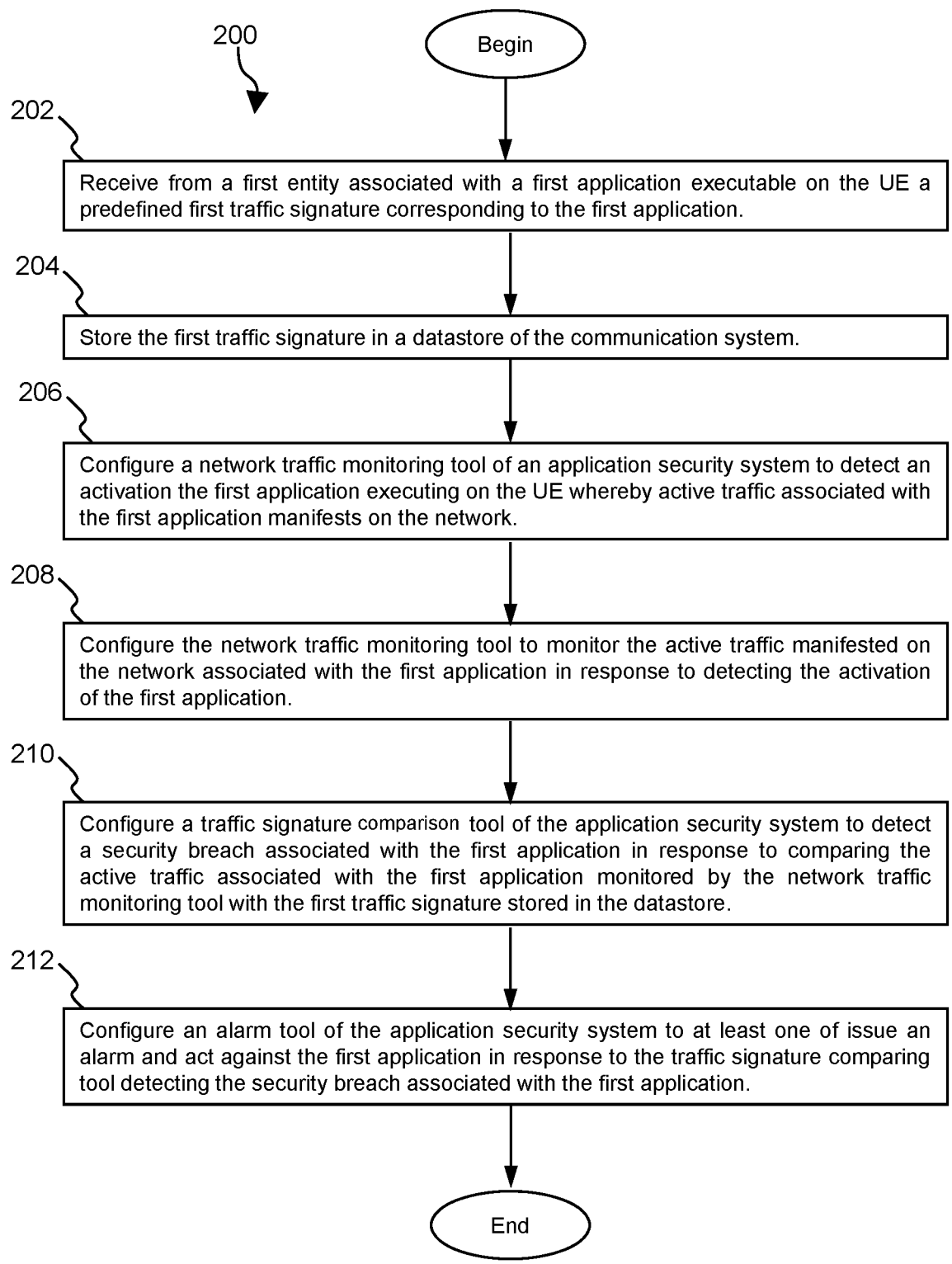
FIG. 2 is a flow chart of a method according to an embodiment of the disclosure.

Turning to FIG. 2, a method 200 is described. In an embodiment, the method 200 is a method for configuring a network (e.g., network 122 illustrated in FIG. 1) of a communication system (e.g., communication system 100 illustrated in FIG. 1) to secure applications executable on a UE (e.g., UE 102 illustrated in FIG. 1 connectable to the network. At block 202, method 200 comprises receiving from a first entity associated with a first application (e.g., one of the client applications 108 illustrated in FIG. 1) executable on the UE a predefined first traffic signature (e.g., one of the application traffic signatures 126 illustrated in FIG. 1) corresponding to the first application. At block 204, the method 200 comprises storing the first traffic signature in a datastore (e.g., datastore 124) of the communication system. In some embodiments, block 204 comprises loading the first traffic signature into a UDM of a 5G core network. In some embodiments, method 200 may additionally include updating the first traffic signature previously stored in the datastore with a new first traffic signature that is different from the first traffic signature originally stored in the datastore.

At block 206, the method 200 comprises configuring a network traffic monitoring tool (e.g., network traffic monitoring tool 142 illustrated in FIG. 1) of an application security system (e.g., application security system 140 illustrated in FIG. 1) to detect an activation of the first application executing on the UE whereby active traffic associated with the first application manifests on the network. At block 208, the method 200 comprises configuring the network traffic monitoring tool to monitor the active traffic manifested on the network associated with the first application in response to detecting the activation of the first application.

At block 210, the method 200 comprises configuring a traffic signature comparison tool (e.g., traffic signature comparison tool 144 illustrated in FIG. 1) of the application security system to detect a security breach associated with the first application in response to comparing the active traffic associated with the first application monitored by the network traffic monitoring tool with the first traffic signature stored in the datastore. At block 212, the method 200 comprises configuring an alarm tool (e.g., alarm tool 146 illustrated in FIG. 1) of the application security system to at least one of issue an alarm and act against the first application in response to the traffic signature comparison tool detecting the security breach associated with the first application.

Figure 3:
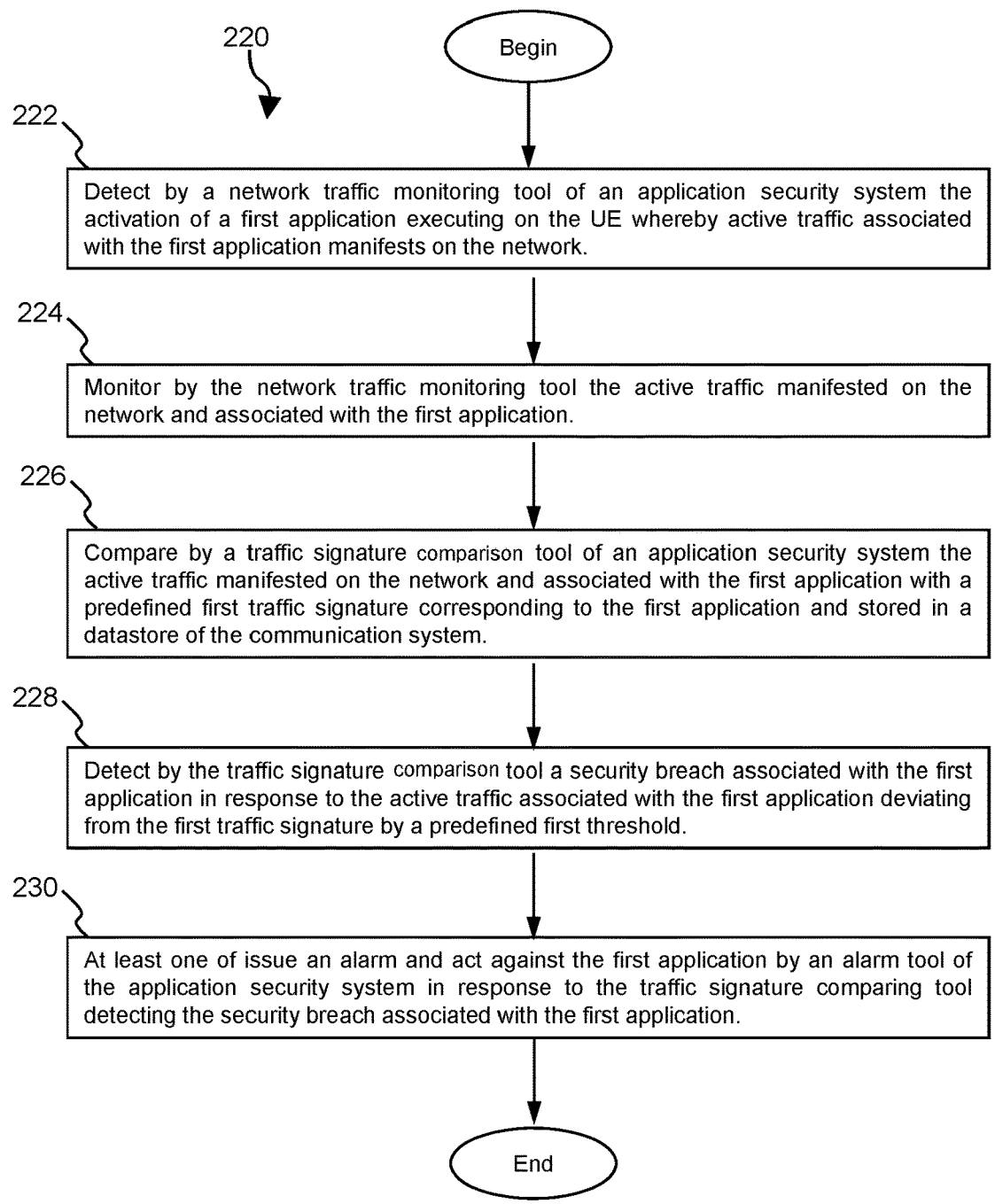
FIG. 3 is a flow chart of another method according to an embodiment of the disclosure.

Turning to FIG. 3, a method 220 is described. In an embodiment, the method 220 is a method for securing applications executable on UE (e.g., UE 102 illustrated in FIG. 1) connectable to a network (e.g., network 122 illustrated in FIG. 1) of a communication system (e.g., communication system 100 illustrated in FIG. 1). At block 222, the method 220 comprises detecting by a network traffic monitoring tool (e.g., network traffic monitoring tool 142 illustrated in FIG. 1) of an application security system (e.g., application security system 140 illustrated in FIG. 1) the activation of a first application (e.g., one of the client applications 108 illustrated in FIG. 1) executing on the UE whereby active traffic associated with the first application manifests on the network. At block 224, the method 220 comprises monitoring by the network traffic monitoring tool the active traffic manifested on the network and associated with the first application.

At block 226, the method 220 comprises comparing by a traffic signature comparison tool (e.g., traffic signature comparison tool 144 illustrated in FIG. 1) of the application security system the active traffic manifested on the network and associated with the first application with a predefined first traffic signature (e.g., one of the application traffic signatures 126 illustrated in FIG. 1) corresponding to the first application and stored in a datastore (e.g., datastore 124 illustrated in FIG. 1) of the communication system. In some embodiments, block 226 comprises loading the first traffic signature into a UDM of a 5G core network.

At block 228, the method 220 comprises detecting by the traffic signature comparison tool a security breach associated with the first application in response to the active traffic associated with the first application deviating from the first traffic signature by a predefined first threshold. At block 230, the method 220 comprises at least one of issuing an alarm and acting against the first application by an alarm tool (e.g., alarm tool 146 illustrated in FIG. 1) of the application security system in response to the traffic signature comparison tool detecting the security breach associated with the first application.

Figure 4A:
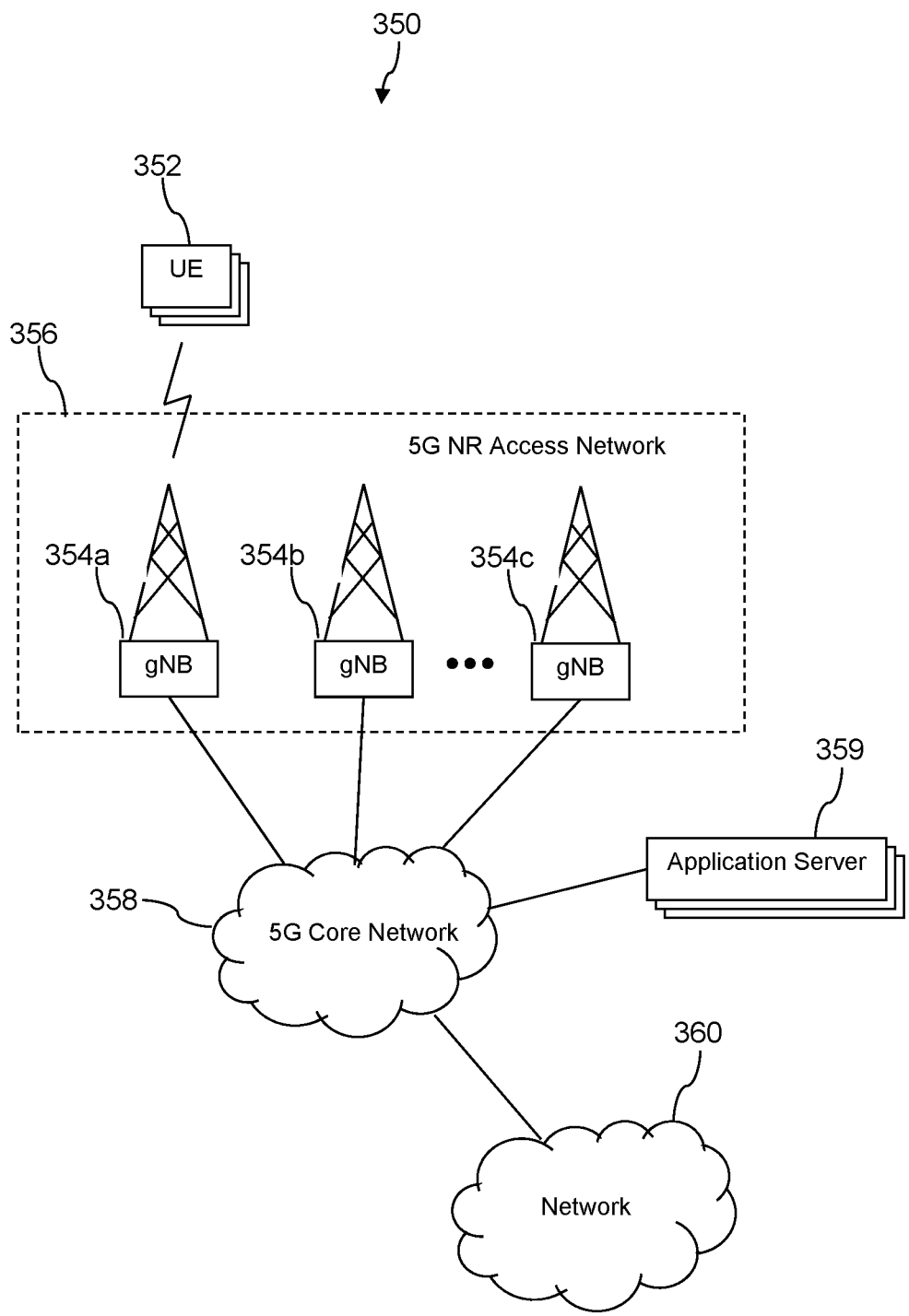
FIG. 4A is a block diagram of another communication system according to an embodiment of the disclosure.

Turning now to FIG. 4A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts.

In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354a, a second access node 354b, and a third access node 354c. It is understood that the access network 356 may include any number of access nodes 354. Further, each access node 354 could be coupled with a core network 358 that provides connectivity with various application servers 359 and/or a network 360. In some embodiments, access nodes 354 comprise non-3GPP access nodes in which access may be provided via WiFi, non-3GPP Interworking Function (N3IWF), etc.

In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354.

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
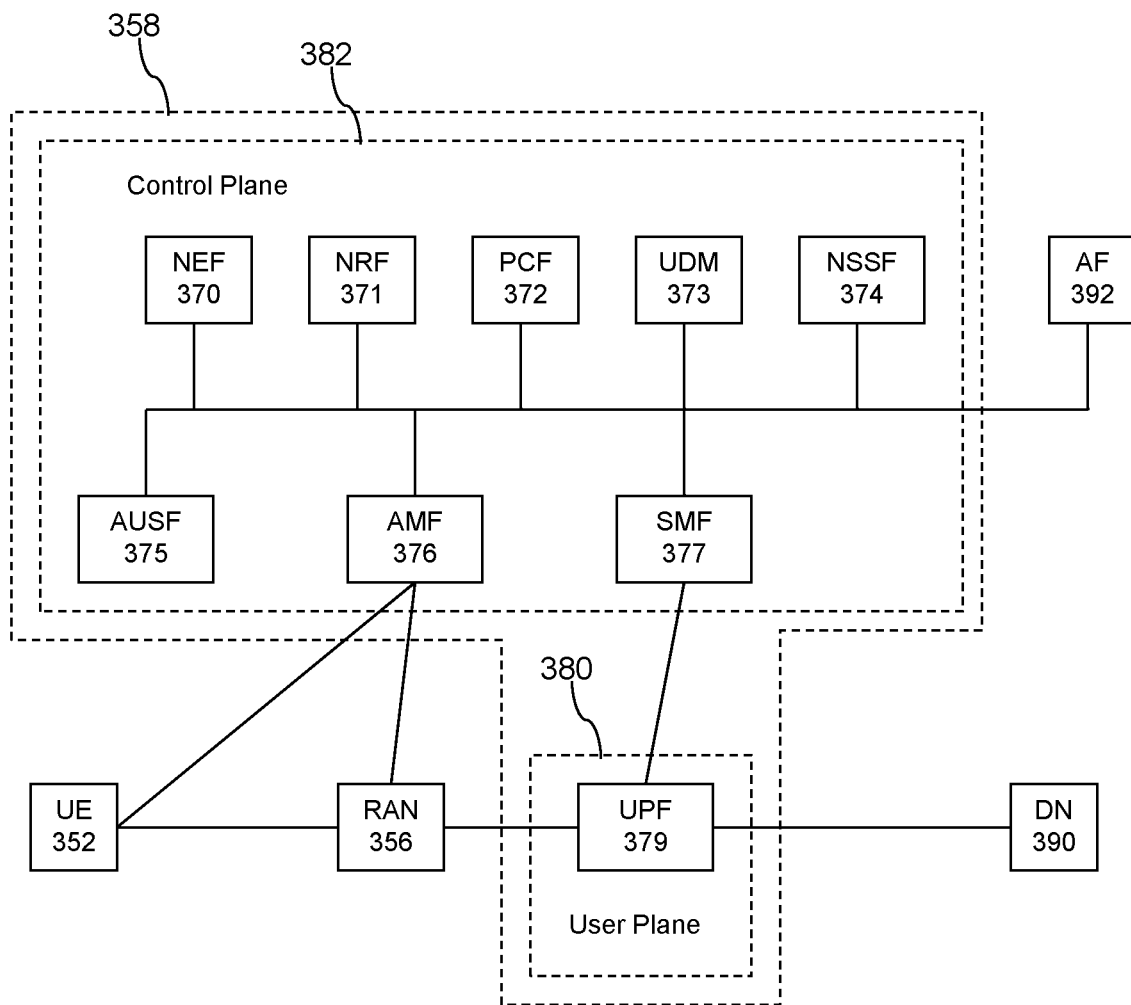
FIG. 4B is a block diagram of a core network of the communication system of FIG. 4A according to an embodiment of the disclosure.

Turning now to FIG. 4B, further details of the core network 358 are described. In an embodiment, the core network 358 is a 5G core network. 5G core network technology is based on a service based architecture paradigm. Rather than constructing the 5G core network as a series of special purpose communication nodes (e.g., a UDM node, an AMF node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a SMF 377, a network exposure function (NEF) 370, a network repository function (NRF) 371, a PCF 372, a UDM 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 4A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) PDU sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information and the user's network policies. An application function 392, which may be coupled to an external application server, exposes the application layer for interacting with the core network 358. In an embodiment, the application function 392 may be execute on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Referring again to FIG. 1, as described above, network 122 comprises a 5G core network in some embodiments. In some embodiments, at least a portion of the functionality of the application security system may be embodied in or loaded into components of the 5G core network (e.g., core network 358 illustrated in FIGS. 4A and 4B). For example, the network traffic monitoring tool 142 may be loaded onto or comprise a feature of the SMF (e.g., SMF 377 illustrated in FIG. 4B) of a 5G core network. In certain embodiments, at least a portion of the functionality of the network traffic monitoring tool 142 may be loaded onto or comprise a feature of the UPF (e.g., UPF 379 illustrated in FIG. 4B) of a 5G core network. Additionally, in some embodiments, the traffic detection filters of one or more application traffic signatures 126 may be loaded into the PCF (e.g., PCF 372 illustrated in FIG. 4B) of a 5G core network. In this manner, all of the information contained in the application traffic signatures 126 need not be loaded into the PCF, minimizing the usage of network resources associated with loading the application traffic signatures 126.

As an example, upon the client application 108 connecting to the network 122, the traffic detection filter of the application traffic signature 126 corresponding to the client application 108 may be loaded (e.g., by a component of the application security system 140) into the PCF of the 5G core network. Additionally, portions of the network traffic monitoring tool 142 embodied in the SMF and/or the UPF of the 5G core network may register a network traffic detection event (e.g., the detection of network traffic ascribed to the client application 108) corresponding to the activation of the client application 108 whereby the client application 108 connects to the network 122.

In this example, upon registering of the traffic detection event, functionality of the traffic signature comparison tool 144 embodied in the SMF of the 5G core network may query the PCF of the 5G core network for all of the information contained in the relevant application traffic signature 126. The PCF may then obtain requested information from the UDM of the 5G core network and provide said information to the SMF in the form of policy rules. Alternatively, an AF (e.g., AF 392 illustrated in FIG. 4B) of the communication system 100 may alert the PCF of the 5G core network that the client application 108 executing on UE 102 has been activated. It may thus be understood that at least some of the functionality of the network traffic monitoring tool 142 may be embodied in an AF of the communication system 100 in some embodiments.

Continuing with this example, in the event that the traffic signature comparison tool 144 detects a security breach of the client application 108, functionality of the traffic signature comparison tool 144 embodied in the SMF of the 5G core network may instruct functionality of the alarm tool 146 embodied in the UPF of the 5G core network to perform a policy-based action against the client application 108. For example, the UPF may block network traffic ascribed to the client application 108 or throttle network traffic ascribed to the client application 108. Additionally, functionality of the alarm tool 146 embodied in the SMF may alert the AF of the communication system 100 that a security breach of the client application 108 has occurred, thereby alerting entities associated with the client application 108 (e.g., developers and/or sponsors of the client application 108) of the security breach. Alternatively, the AF may receive an alert from the application server 130 regarding the security breach and, in response to receiving the alert, generate a NEF message such that the 5G core network may be informed (via an API call received by the NEF of the 5G core network) of the security breach. In this manner, an API call from the AF may enable the application server 130 to assist in facilitating the detection and performance of remedial actions concerning the security breach.

Figure 5A:
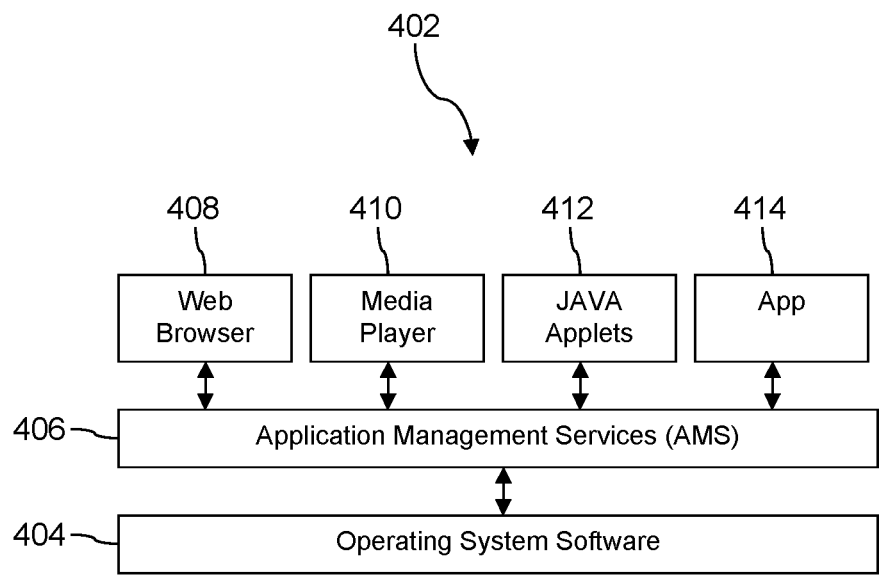
FIG. 5A is a block diagram of a software environment according to an embodiment of the disclosure.

FIG. 5A illustrates a software environment 402 that may be implemented by a digital signal processor (DSP) of UE 400. The DSP of UE 400 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 400. Also shown in FIG. 5A are a web browser application 408, a media player application 410, and JAVA applets 412. The web browser application 408 may be executed by the UE 400 to browse content and/or the Internet, for example when the UE 400 is coupled to a network via a wireless link. The web browser application 408 may permit a user to enter information into forms and select links to retrieve and view web pages. The media player application 410 may be executed by the UE 400 to play audio or audiovisual media. The JAVA applets 412 may be executed by the UE 400 to provide a variety of functionality including games, utilities, and other functionality.

Figure 5B:
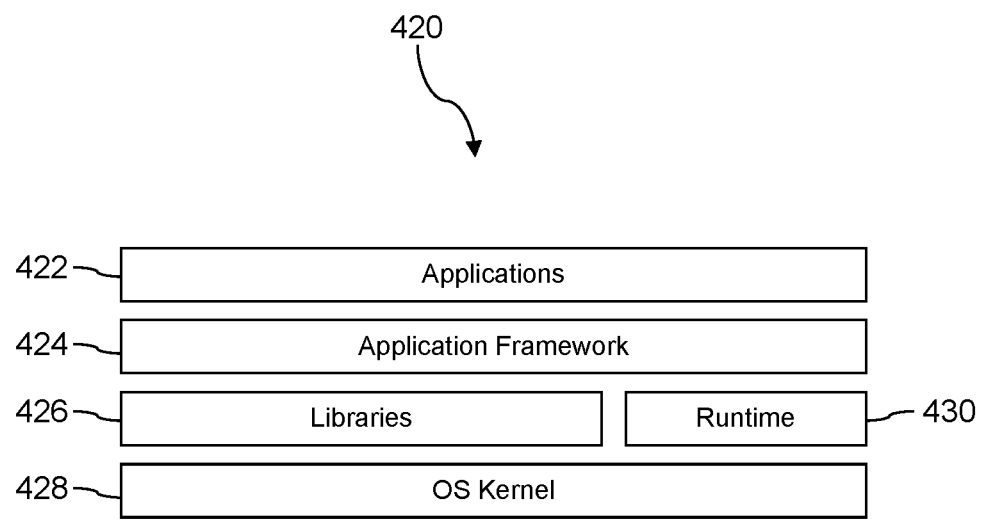
FIG. 5B is a block diagram of another software environment according to an embodiment of the disclosure.

FIG. 5B illustrates an alternative software environment 420 that may be implemented by the DSP of UE 400. The DSP of UE 400 executes operating system kernel (OS kernel) 428 and an execution runtime 430. The DSP of UE 400 executes applications 422 that may execute in the execution runtime 430 and may rely upon services provided by the application framework 424. Applications 422 and the application framework 424 may rely upon functionality provided via the libraries 426.

Figure 6:
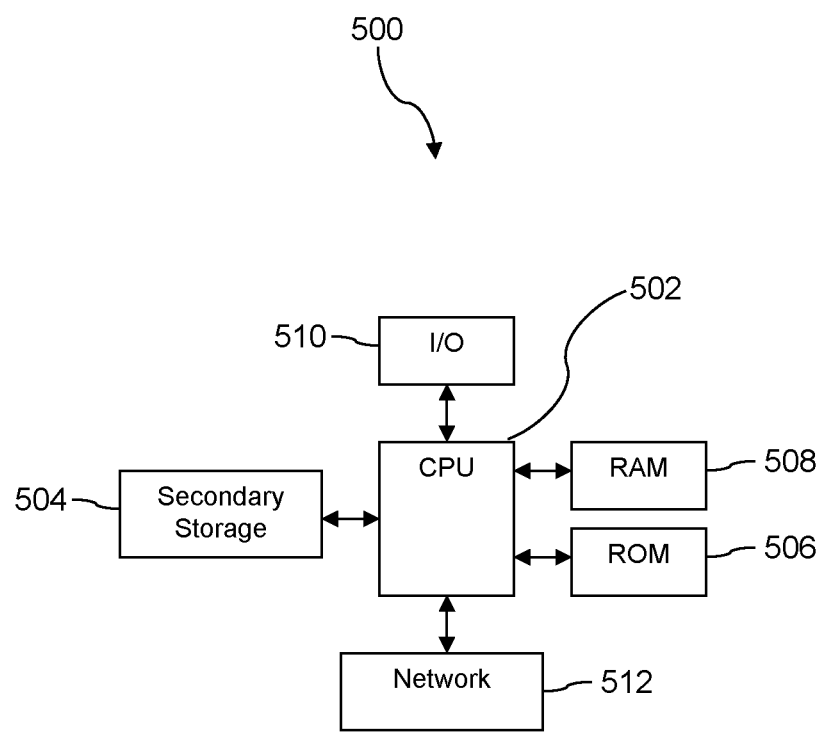
FIG. 6 is a block diagram of a computer system according to an embodiment of the disclosure.

FIG. 6 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for configuring a network of a communication system to secure applications executable on user equipment (UE) connectable to the network, the method comprising:
   receiving from a first entity associated with a first application executable on the UE a predefined first traffic signature corresponding to the first application;
   storing the first traffic signature in a datastore of the communication system;
   configuring a network traffic monitoring tool of an application security system to detect an activation of the first application executing on the UE whereby active traffic associated with the first application manifests on the network;
   configuring the network traffic monitoring tool to monitor the active traffic manifested on the network associated with the first application in response to detecting the activation of the first application;
   configuring a traffic signature comparison tool of the application security system to detect a security breach associated with the first application in response to comparing the active traffic associated with the first application monitored by the network traffic monitoring tool with the first traffic signature stored in the datastore;

configuring an alarm tool of the application security system to at least one of issue an alarm and act against the first application in response to the traffic signature comparison tool detecting the security breach associated with the first application;

receiving from a second entity associated with a second application executable on the UE a predefined second traffic signature corresponding to the second application, wherein the second traffic signature is different from the first traffic signature;

storing by the application security system the second traffic signature in the datastore;

configuring the network traffic monitoring tool to detect an activation of the second application executing on the UE whereby active traffic associated with the second application manifests on the network;

configuring the network traffic monitoring tool to monitor the active traffic manifested on the network and associated with the second application in response to detecting the activation of the second application; and configuring the traffic signature comparison tool to detect a security breach associated with the second application in response to comparing the active traffic associated with the second application monitored by the network traffic monitoring tool with the second traffic signature stored in the datastore.

2. The method of claim 1, further comprising:
configuring the traffic signature comparison tool to detect the security breach associated with the first application by determining that the active traffic associated with the first application deviates from the first traffic signature by a predefined first threshold.

3. The method of claim 1, wherein the first traffic signature associated with the first application comprises at least one of an expected number of connections over a predefined period of time made between the first application and an application server of the communication system associated with the first application, expected identities of destination addresses of traffic on the network ascribed to the first application, and one or more expected Quality of Service (QOS) parameters of the traffic on the network ascribed to the first application.

4. The method of claim 1, wherein the first traffic signature comprises a traffic detection filter usable by the network traffic monitoring tool to detect the activation of the first application.

5. The method of claim 1, further comprising:
configuring the alarm tool to issue an alarm in the form of a notification transmitted to at least one of the UE and the first entity indicating the security breach in response to the traffic signature comparison tool detecting the security breach associated with the first application.

6. The method of claim 1, further comprising:
configuring the alarm tool to act against the first application by at least one of degrading the performance of the first application and blocking access to the network for the first application in response to the traffic signature comparison tool detecting the security breach associated with the first application.

7. The method of claim 1, wherein the traffic signature comparison tool of the application security system comprises a feature of at least one of a session management function (SMF) and a user plane function (UPF) of a 5G core network.

8. The method of claim 1, wherein the activation of the first application corresponds to the establishment of an active session between the first application executing on the UE and a first application server of the communication system and connected to the UE through the network.

9. The method of claim 1, wherein the network traffic monitoring tool of the application security system comprises a feature of a user plane function (UPF) of a 5G core network.

10. A method for securing applications executable on user equipment (UE) connectable to a network of a communication system, the method comprising:
detecting by a network traffic monitoring tool of an application security system the activation of a first application executing on the UE whereby active traffic associated with the first application manifests on the network;

monitoring by the network traffic monitoring tool the active traffic manifested on the network and associated with the first application;

comparing by a traffic signature comparison tool of the application security system the active traffic manifested on the network and associated with the first application with a predefined first traffic signature corresponding to the first application and stored in a datastore of the communication system;

detecting by the traffic signature comparison tool a security breach associated with the first application in response to the active traffic associated with the first application deviating from the first traffic signature by a predefined first threshold; and at least one of issuing an alarm and acting against the first application by an alarm tool of the application security system in response to the traffic signature comparison tool detecting the security breach associated with the first application.

11. The method of claim 10, wherein the first traffic signature associated with the first application comprises at least one of an expected number of connections over a predefined period of time made between the first application and an application server of the communication system associated with the first application, expected identities of destination addresses of traffic on the network ascribed to the first application, and one or more expected Quality of Service (QOS) parameters of the traffic on the network ascribed to the first application.

12. The method of claim 10, wherein the first traffic signature associated with the first application comprises at least one of the number of connections over a predefined period of time made between the first application and an application server of the communication system associated with the first application, identities of destination addresses of traffic on the network ascribed to the first application, and one or more Quality of Service (QOS) parameters of the traffic on the network ascribed to the first application.

13. The method of claim 10, wherein the first traffic signature comprises a traffic detection filter usable by the network traffic monitoring tool to detect the activation of the first application.

14. The method of claim 10, further comprising:
issuing an alarm by the alarm tool in the form of a notification transmitted to at least one of the UE and the first entity indicating the security breach in response to the traffic signature comparison tool detecting the security breach associated with the first application.

15. The method of claim 10, further comprising:
acting against the first application by the alarm tool by at least one of degrading the performance of the first application and blocking access to the network for the first application in response to the traffic signature comparison tool detecting the security breach associated with the first application.

16. The method of claim 10, wherein the activation of the first application corresponds to the establishment of an active session between the first application executing on the UE and a first application server of the communication system and connected to the UE through the network.

17. The method of claim 10, wherein the network traffic monitoring tool of the application security system comprises a feature of a user plane function (UPF) of a 5G core network.

18. The method of claim 10, wherein the traffic signature comparison tool of the application security system comprises a feature of at least one of a session management function (SMF) and a user plane function (UPF) of a 5G core network.

19. The method of claim 10, further comprising:
detecting by the network traffic monitoring tool the activation of a second application executing on the UE whereby active traffic associated with the second application manifests on the network;

monitoring by the network traffic monitoring tool the active traffic manifested on the network and associated with the second application;

comparing by the traffic signature comparison tool the active traffic manifested on the network and associated with the second application with a predefined second traffic signature corresponding to the second application and stored in the datastore of the communication system, wherein the second traffic signature is different from the first traffic signature stored in the datastore; and detecting by the traffic signature comparison tool a security breach associated with the second application in response to the active traffic associated with the second application deviating from the second traffic signature by a second predefined threshold.

20. The method of claim 10, wherein the security breach indicates an unauthorized modification to the first application.

* * * * *